(12) United States Patent
Li et al.

(10) Patent No.: US 11,640,007 B2
(45) Date of Patent: May 2, 2023

(54) SYSTEM AND METHOD FOR PHASED ARRAY SOUND WAVE ADVANCED GEOLOGICAL EXPLORATION FOR SHIELD TUNNELING MACHINE

(71) Applicant: SHANDONG UNIVERSITY, Shandong (CN)

(72) Inventors: Shucai Li, Jinan (CN); Bin Liu, Jinan (CN); Xinji Xu, Jinan (CN); Lei Chen, Jinan (CN); Chao Fu, Jinan (CN); Lei Hao, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/769,909

(22) PCT Filed: Dec. 8, 2020

(86) PCT No.: PCT/CN2020/134618
§ 371 (c)(1),
(2) Date: Apr. 18, 2022

(87) PCT Pub. No.: WO2021/129381
PCT Pub. Date: Jul. 1, 2021

(65) Prior Publication Data
US 2022/0390635 A1     Dec. 8, 2022

(30) Foreign Application Priority Data

Dec. 23, 2019   (CN) .......................... 201911338546.7

(51) Int. Cl.
*G01V 1/30*        (2006.01)
*G01V 1/18*        (2006.01)
(52) U.S. Cl.
CPC .............. *G01V 1/302* (2013.01); *G01V 1/189* (2013.01)

(58) Field of Classification Search
CPC .......... G01V 1/302; G01V 1/189; G01V 1/02; G01V 1/20; G01V 1/303; G01V 1/36;
(Continued)

(56) References Cited

U.S. PATENT DOCUMENTS

| 5,826,653 A | 10/1998 | Rynne et al. |
| 2016/0109601 A1 | 4/2016 | Wisloff et al. |

FOREIGN PATENT DOCUMENTS

| CN | 101122228 A | 2/2008 |
| CN | 101363314 A | 2/2009 |

(Continued)

OTHER PUBLICATIONS

Kuchta et al., Evaluating the Effectiveness of Various Nozzle Designs for High Pressure Waterjet Scaling of Loose Rocks from Mine Openings, 2008, American Rock Mechanics Association, ARMA-08-337, pp. 1-13 (Year: 2008).*

Yasuda et al., Application of ultrahigh pressure waterjet for rock drilling, 1990, Static and Dynamic Considerations in Rock Engineering, pp. 367-373 (Year: 1990).*

(Continued)

*Primary Examiner* — Mischita L Henson
(74) *Attorney, Agent, or Firm* — Oliff PLC

(57) ABSTRACT

The present invention discloses a system and method for phased array sound wave advanced geological exploration for a shield tunneling machine. The system includes a phased array sound wave emitting and receiving apparatus, a probe automatic telescopic apparatus, an automatic protection and cleaning apparatus, and a signal processing and imaging system. Sonic probes are installed on a side wall of a main spoke, opposite to a rotation direction, of a cutterhead of the shield tunneling machine, on the basis of automatic detection of a telescopic state and a contact state, sonic array probes are enabled to make contact with a tunnel face by a hydraulic push rod, a focus sound wave is emitted by using a phased array emitting technology, and a reflected wave signal with front geological information reflected from the (Continued)

front of the tunnel face is received. A scanning direction of a sound wave beam is controlled and changed continuously through a host system, on the premise of obtaining a suspected abnormal body position, the suspected position is imaged in detail by using a focusing image till scanning of a whole two-dimensional section is completed, then the cutterhead is rotated to change an arrangement direction of an array to continue scanning of a next two-dimensional section, and finally three-dimensional geological exploration in front of the tunnel face is realized.

9 Claims, 3 Drawing Sheets

(58) Field of Classification Search
CPC ...... G01V 2210/55; G01V 1/00; E21B 7/046; E21D 9/06
See application file for complete search history.

(56) References Cited

FOREIGN PATENT DOCUMENTS

| | | | |
|---|---|---|---|
| CN | 103760607 | A | 4/2014 |
| CN | 104678428 | A | 6/2015 |
| CN | 108303729 | A | 7/2018 |
| CN | 108693249 | A | 10/2018 |
| CN | 109407144 | A | 3/2019 |
| CN | 110045412 | A | 7/2019 |
| CN | 110988980 | A | 4/2020 |

OTHER PUBLICATIONS

Mar. 1, 2021 International Search Report issued in International Patent Application No. PCT/CN2020/134618.
Mar. 1, 2021 Written Opinion issued in International Patent Application No. PCT/CN2020/134618.
Aug. 26, 2020 Office Action issued in Chinese Patent Application No. 201911338546.7.

* cited by examiner

SYSTEM AND METHOD FOR PHASED ARRAY SOUND WAVE ADVANCED GEOLOGICAL EXPLORATION FOR SHIELD TUNNELING MACHINE

TECHNICAL FIELD

The present invention relates to the field of advanced geological forecast in a construction process of a tunneling machine, and in particular to a system and method for phased array sound wave advanced geological forecast exploration for a shield tunneling machine.

BACKGROUND

The 21$^{st}$ century has witnessed a large growth of underground space. With comprehensive undertaking of construction of Western China, more long and large tunnel projects will be built in fields of railways, highways, water and electricity, cross-regional water transfer and the like. Advanced geological forecast is of great interest to ensure the safety, quality and progress of the tunnel construction projects. An advanced forecast approach is quite necessary especially in a tunnel project with complicated geological conditions. The Western China is a mountainous area and has complicated geological conditions, and geological disasters such as collapse, roof falling, water inrush and mud inrush occur occasionally, which bring a great difficulty to construction, and even lead to great loss of life and property. Therefore, the geological advanced forecast has been gradually carried out in underground tunnel construction of the highway, railway and water and electricity projects, so as to ensure construction safety and reduce loss caused by geological disasters.

At present, a shield tunneling machine is a special engineering machine for tunneling. An existing shield tunneling machine is integrated with mechanical, electrical, liquid, sensing and information technologies, has functions of excavating and cutting a soil mass, delivering soil residues, assembling tunnel linings, measuring, guiding, error correcting and the like, and has been widely applied to subway, railway, highway, municipal, and water and electricity tunnel projects.

Problems to be solved by the advanced geological forecast under construction conditions of the shield tunneling machine mainly include determination of position and scale of an unfavorable geological object such as boulder and riprap. As for the unfavorable geological object such as boulder and riprap, starting from 1950s, methods of advanced geological heading, horizontal advanced drilling, cross hole seismic CT and the like has been used successively in China to perform advanced geological forecast. The above methods have large interference with tunneling construction of the shield tunneling machine, are limited in detection distance and cannot meet demands of fast and scientific construction of tunnels. In order to find a scientific forecast method with small construction interference, long detection distance and accurate forecast, studies have been carried out to develop new geophysical methods for advanced forecast. For example, there are methods of geological radar, reflection seismic and the like. As the cutterhead of the shield tunneling machine always sticks close to a tunnel face, a high-resolution geological radar method observing system is limited in its layout and cannot perform scanning and detection on the tunnel face.

In order to conform to the situation that the tunneling machine has currently been widely applied to tunnel engineering construction and meet construction requirements of being efficient, safe and economical, the inventor provides and designs an automatic-exploration advanced geological forecast apparatus for the shield tunneling machine. Due to limitation of a construction environment of the shield tunneling machine and complexity of mechanical equipment, a phased array sound wave advanced geological forecast apparatus for the shield tunneling machine mainly faces the following difficulties:

(1) Reflected wave seismic exploration is long in forecast distance, but its seismic wave frequency is low, and the image resolution cannot meet the requirements of fine shield tunneling construction, and cannot provide accurate detection of boulder and riprap, leading to wear of the cutterhead of the shield tunneling machine and seizing up of the machine.

(2) As for the operational characteristics of the shield tunneling machine, the exterior of the cutterhead is filled with silt or muddy water, strata suitable for operation of the shield tunneling machine usually include soil stratum or soft rock stratum, where attenuation of seismic waves is severe for conventional methods.

(3) Since the space for observation is limited in the tunnel, the layout of the observing system is limited, effective reflection waves cannot be received in a large range, and a received signal is susceptible to interference from surrounding clutter, making it difficult to provide an accurate advanced forecast.

(4) Because there are many phased array sound wave transducers, the quantity of data containing abnormal geologic body information is huge. Therefore, how to fully utilize characteristics of the shield tunneling machine to provide an efficient abnormal body imaging method and realize real-time imaging of unfavorable geologic bodies is an urgent problem to be solved.

SUMMARY

In order to overcome the defects in the prior art and meet the construction requirements of being safe, efficient and economical, the present invention provides a system and method for advanced geological forecast for a shield tunneling machine by using focused sound waves for exploration. The system is high in automation degree and is provided with a plurality of sound wave elements configured at assigned positions, and the above plurality of sound wave elements may emit a sound wave in a phase-control mode to a test object and receive a sound wave reflected by the test object. Phase-control emitting is characterized in that an emitted sound wave signal is emitted to a stratum in a form of a beam with a certain width, and its sound field has certain directivity, high penetrability, high resolution, and high acoustical efficiency. Problems of insufficient resolution and severe attenuation of energy in the past advanced geological exploration can be effectively solved. The apparatus is provided with automatic protection, telescopic and cleaning apparatuses for a probe; waterways, oil paths and circuits are configured reasonably; and circuit control and data backhaul of a cutterhead exploration system are realized.

To achieve the foregoing objectives, the present invention uses the following specific solutions:

In a first aspect, the present invention provides a system for phased array sound wave advanced geological exploration for a shield tunneling machine, which includes a phased array sound wave emitting and receiving apparatus arranged on a side wall of a main spoke, opposite to a rotation direction, of a cutterhead of the shield tunneling machine;

the phased array sound wave emitting and receiving apparatus includes a plurality of sonic probe groups, each of the sonic probe groups includes a plurality of sound wave emitting and receiving units, and the plurality of sonic probe groups form a sound wave array element group; and each of the sound wave emitting and receiving units has functions of emitting a sound wave and receiving a reflected wave.

Each of the sonic probe groups is installed in a probe protection apparatus; the probe protection apparatus is installed at a head of a telescopic rod of a hydraulic propelling apparatus and can rotate relative to a hydraulic push rod, and a pressure senor is further installed on the probe protection apparatus and configured to detect pressure intensity of contact between sonic probes and a tunnel face; a high-pressure water spray nozzle is arranged on the telescopic rod of the hydraulic propelling apparatus, and the high-pressure water spray nozzle is connected with a water supply apparatus through a pipeline; and the pressure sensor, the phased array sound wave emitting and receiving apparatus and the water supply apparatus are connected with a control apparatus.

As a further technical solution, the plurality of sonic probe groups are arranged in a single line mode or in a cross shape to be installed on the side wall of the main spoke, opposite to the rotation direction, of the cutterhead of the shield tunneling machine, so that direct friction and impact of soil blocks and broken stone can be avoided during tunneling of the cutterhead, and a certain protection effect is realized.

As a further technical solution, each of the sonic probe groups is distributed on side walls of the main spoke at two sides of a center of the cutterhead at equal intervals. Installation of the probes does not change an original structure of the cutterhead of the shield tunneling machine and is suitable for production and retrofitting in an original factory and later-stage retrofitting of all shield tunneling machines that have already been put into production.

As a further technical solution, the probe protection apparatus is a spherical protection apparatus; each of the sonic probe groups is installed in the spherical protection apparatus; the spherical protection apparatus can rotate relative to a head of the push rod; and sealing is performed between the spherical protection apparatus and the head of the push rod.

As a further technical solution, a plurality of high-pressure water spray nozzles are arranged annularly at periphery of a top of each section of the hydraulic telescopic rod; before retracting and in a process of retracting of the hydraulic telescopic rod, a high-speed water flow can be sprayed with the water spray nozzles to wash away mud and dirt on the hydraulic telescopic rod, and the hydraulic telescopic rod can be prevented from being blocked by sundries during retracting.

In a second aspect, the present invention further provides an exploration method based on the above system for phased array sound wave advanced geological exploration for a shield tunneling machine, which specifically includes:

step 1, turning on a probe protection apparatus, and pushing, by a hydraulic telescopic rod, a plurality of sonic probe groups forwards till all the sonic probe groups are in good contact with a tunnel face;

step 2, performing triggering through a single sonic probe group, receiving and obtaining, by all the sonic probe groups, reflected echo information, and obtaining a background velocity field by using a processing and imaging system;

step 3, controlling, by the system, different delays of all the sonic probe groups according to the background velocity field to form a scanning sound beam in a certain direction;

step 4, receiving, by each of the sonic probe groups, an echo signal, storing the echo signal in a storage unit, uploading, by the storage unit, echo data to the processing and imaging system, and obtaining, by the processing and imaging system, an imaging result of a suspected abnormal body position in a scanning direction at a side;

step 5, performing, by the system, one-by-one focusing by changing trigger delay between the sonic probe groups according to the suspected abnormal body position, receiving, by each of the sonic probe groups, the echo signal, storing the echo signal in the storage unit, uploading, by the storage unit, data to the imaging system, and obtaining a detailed two-dimensional single-direction scanning result;

step 6, repeating step 3, step 4 and step 5, performing scanning sound beams in different directions by changing the delays of the sonic probe groups till data collection and uploading of a whole section are completed, and receiving, by the processing and imaging system, scanning and imaging data of a whole two-dimensional section to complete a two-dimensional section image;

step 7, rotating a cutterhead to enable a whole sound wave array element group to rotate by an angle around a central axis of the cutterhead, and repeating step 3, step 4, step 5 and step 6 to obtain a two-dimensional section image at another angle;

step 8, repeating step 7 till exploration covers the whole tunnel face, obtaining scanning two-dimensional section images corresponding to all angles, and finally integrating, by the processing and imaging system, these two-dimensional sections into a three-dimensional image; and step 9, retracting the hydraulic telescopic rod, drawing back probes, automatically washing away muddy water or dirt on the probes and the hydraulic telescopic rod in a process of drawing back, after the probes are returned, starting the protection apparatus, and starting a drying apparatus to ensure air in the hydraulic telescopic rod to be dry. Advanced geological exploration is completed.

As a further technical solution, a step length of a spatial scanning angle in step 5 is 30+. When single-line arrangement is adopted, the cutterhead only needs to rotate five times, detection results of six two-dimensional sections are collected, and a geological condition in front of the whole tunnel face can be covered; and when cross-shape arrangement is adopted, the cutterhead only needs to rotate twice, detection results of three two-dimensional sections are collected, and the geological condition in front of the whole tunnel face can be covered.

In the above detection method, specific imaging steps include:

1) after each sound wave array element group adheres to the tunnel face, stimulating, by a single sound wave array element group, a sound wave with zero delay, receiving, by the other sound wave array element groups, a direct wave, and calculating a wave velocity of the direct wave of rock in front of the tunnel face according to a position of the probe of each of the sound wave array element groups and receiving time of the direct wave;

2) calculating delay time of each array transducer according to the wave velocity of the direct wave of tunnel face surrounding rock obtained in the first step and a mutual position relation of tunnel face emitting and receiving probes;

3) controlling sound wave emitting of each of the sound wave array element groups according to the obtained delay time, changing the delay time, then changing an advancing direction of a sound wave beam till scanning and detection of a whole two-dimensional section in front of the tunnel face are completed, and obtaining imaging data;

4) analyzing the imaging data, obtaining a possible occurrence range of a geological abnormal body in front of the tunnel face, adopting a time reversal mirror imaging algorithm, stimulating, by the array transducer, a reverse delay signal, obtaining a local focus signal feature, and then implementing two-dimensional focusing imaging; and 5) obtaining a three-dimensional geological image in front of the tunnel face through comprehensive analysis according to a plurality of obtained two-dimensional focusing imaging results.

The present invention has the following beneficial effects:

(1) The present invention provides the system and method for phased array sound wave advanced geological exploration for a shield tunneling machine, integrated carrying of the shield tunneling machine and a sound wave detection instrument is realized; the automation degree, efficiency and detection resolution are high; there is no interference with construction of the shield tunneling machine; and the requirements of being safe and efficient of the shield tunneling machine are met.

(2) Two observation modes suitable for an operation environment of the shield tunneling machine are designed; a cutterhead structure is reasonably utilized, limited observation space of the tunnel face is fully utilized, a detector is arranged on the cutterhead in a single-line mode or a cross shape, a reflected wave from the front of the tunnel face can be fully received, reliable detection data can be provided for the three-dimensional geological imaging of the front of the tunnel face, and meanwhile the cutterhead only needs to rotate by 150° or 60° to complete covering detection of the whole tunnel face.

(3) A process and method for tunnel geological phased array advanced exploration time detailing imaging is designed; on the premise of obtaining a suspected position of the abnormal geological body based on scanning and according to a difference in detection azimuth, stimulation delay of the transducer is automatically adjusted, an energy compensation method is utilized to reduce the strong attenuation of the sound wave caused by the cutterhead mud cake, and signal intensity of detecting a far field is enhanced; focusing detection and focusing of the sound wave are realized by using a time reversal mirror focusing algorithm, and finally a sub-meter detailed detection result in front of the tunnel face can be obtained.

Figure 1:
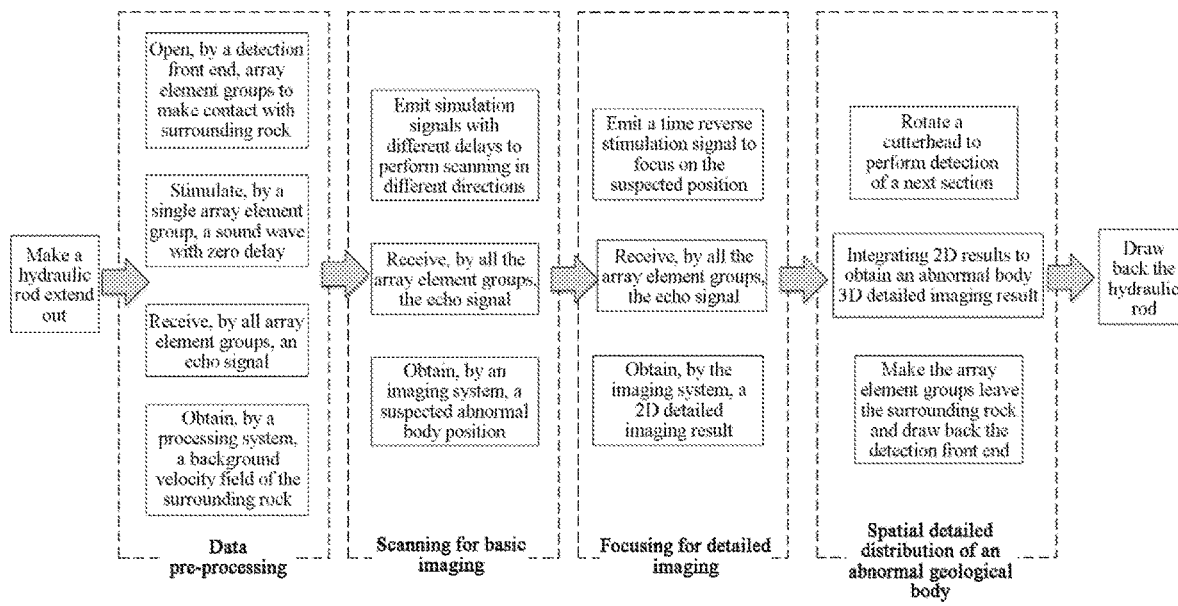
FIG. 1 is a flowchart showing operation of an apparatus for advanced geological forecast.

In figures: 1, abnormal body in front of tunnel face; 2, tunnel face; 3, sonic probe group; 4, probe data transmission line and water delivery line; 5, multipath rotation apparatus; 6, shield tunneling machine trolley; 7, surrounding rock; 8, data transmission line; 9, segment; 10, shield tunneling machine exploration master control system; 11, sonic probe group; 12, pressure sensor; 13, spherical rotation protection apparatus; 14, hydraulic telescopic rod; 15, high-pressure water spray nozzle; 16, signal transmission line; 17, rotation motor; 18, installing plate; 19, screw installing hole; 20, high-pressure spray nozzle waterway; 21, drying apparatus; 22, spray nozzle booster; and 23, data, circuit and waterway comprehensive transmission line.

DETAILED DESCRIPTION

The present invention is described in detail below with reference to the drawings.

It should be noted that the following detailed descriptions are all exemplary and are intended to provide a further understanding of this application. Unless otherwise specified, all technical and scientific terms used in the present invention have the same meaning as commonly understood by a person of ordinary skill in the art to which this application belongs.

It should be noted that terms used herein are only for describing specific implementations and are not intended to limit exemplary implementations according to this application. As used herein, the singular form is also intended to include the plural form unless the present invention clearly dictates otherwise. In addition, it should be further understood that, terms "comprise" and/or "include" used in this specification indicate that there are features, steps, operations, devices, components, and/or combinations thereof.

In order to solve problems provided in the prior art, the present embodiment provides a system for phased array sound wave advanced geological forecast for a shield tunneling machine. The system mainly includes a sound wave emitting and receiving apparatus, a probe telescopic protection apparatus, a cleaning apparatus, a multipath rotation apparatus, a cable system and a processing and imaging system.

The sound wave emitting and receiving apparatus is a phased array sound wave emitting and receiving apparatus and includes a plurality of sonic probe groups; each of the sonic probe groups includes a plurality of sound wave emitting and receiving units; and each of the sound wave emitting and receiving units has functions of emitting a sound wave and receiving a reflected wave. A focus sound wave can be emitted in a phase-control mode under control of a master system.

The probe telescopic protection apparatus includes a probe protection apparatus, a pressure sensor and a hydraulic propelling apparatus; each of the sonic probe groups is installed in the probe protection apparatus; the probe protection apparatus is installed at a head of a telescopic rod of the hydraulic propelling apparatus and can rotate relative to a hydraulic push rod; the pressure sensor is further installed on the probe protection apparatus and configured to detect pressure intensity of contact between a sonic probe and a tunnel face; the cleaning apparatus includes a high-pressure water spray nozzle arranged on the telescopic rod of the hydraulic propelling apparatus; and the high-pressure water spray nozzle is connected with a water supply apparatus through a pipeline. The multipath rotation apparatus is a driving apparatus which drives the cutterhead of the shield tunneling machine to rotate. The cable system is all cables used in the system, and the processing and imaging system is for data processing and imaging.

Specifically, detailed description is made below with reference to FIG. 2, FIG. 3, FIG. 4 and FIG. 5.

Figure 2:
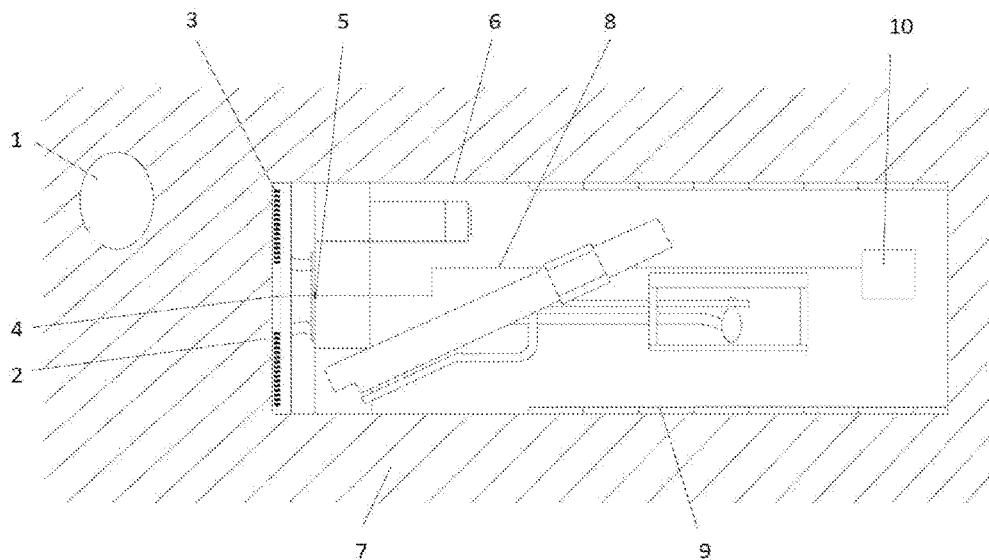
FIG. 2 is a structural sectional view of overall installation of an apparatus for advanced geological forecast.

Specifically, an overall structure of the present invention is shown in FIG. 2. A whole exploration apparatus is installed on an existing shield tunneling machine trolley 6 and is suitable for production and retrofitting of the shield tunneling machine in an original factory and all later-stage retrofitting of the shield tunneling machines that have already been put into production.

Figure 3:
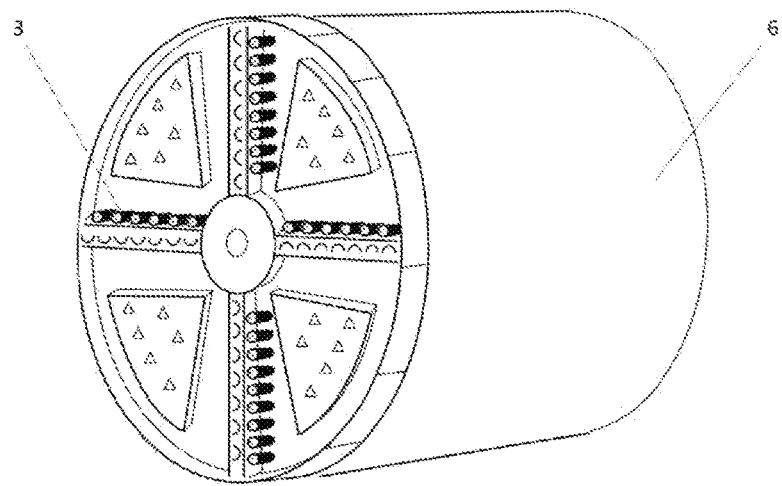
FIG. 3 is a schematic diagram of a sonic probe for a cutterhead of a shield tunneling machine.

As shown in FIG. 3, the plurality of sonic probe groups 3 are arranged on a side wall of a main spoke, opposite to a rotation direction, of the cutterhead of the shield tunneling machine in a single-line mode or a cross shape, so that direct friction and impact of soil blocks and broken stone can be avoided during tunneling of the cutterhead, and a certain protection effect is realized. FIG. 3 shows a cross-shape arrangement mode, and single-line arrangement is an arrangement in only one column in a vertical direction, or an arrangement of only one column in a transverse direction. In the present embodiment, a total quantity of the sonic probe groups is 30 each of the sonic probe groups includes 9 sound wave emitting and receiving units; and 30 sonic probe groups are distributed on side walls of the main spoke at two sides of a center of the cutterhead at equal intervals. Specifically, in FIG. 3, 12 sonic probe groups are arranged in a horizontal direction, 18 sonic probe groups are arranged in a vertical direction, and installation of the whole sonic probe groups does not change an original structure of the cutterhead of the shield tunneling machine.

Figure 4:
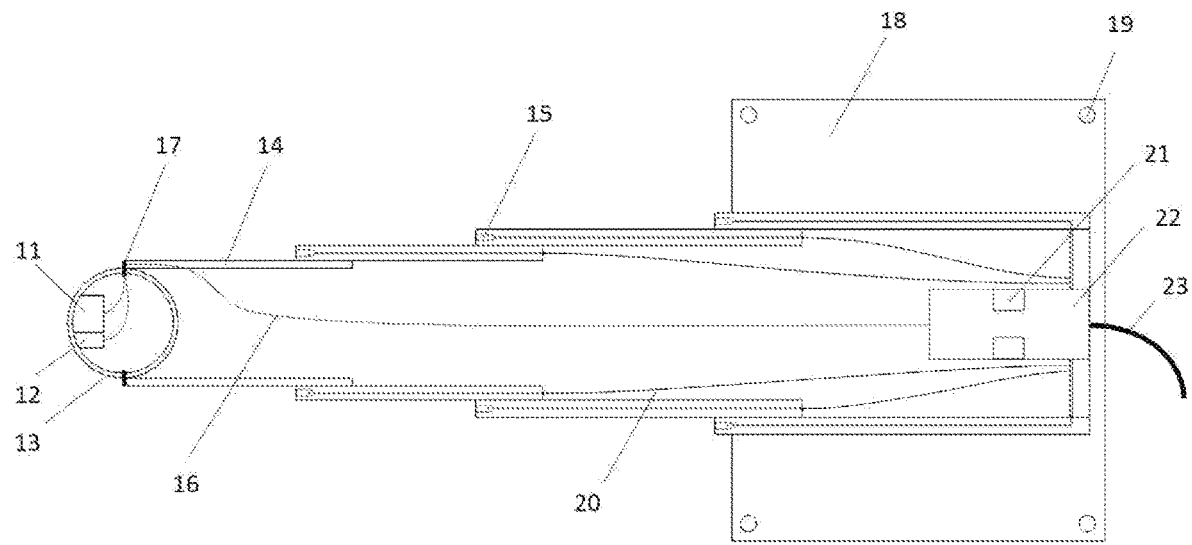
FIG. 4 is a sectional view of a telescopic state of a sonic probe for a shield tunneling machine.
Figure 5:
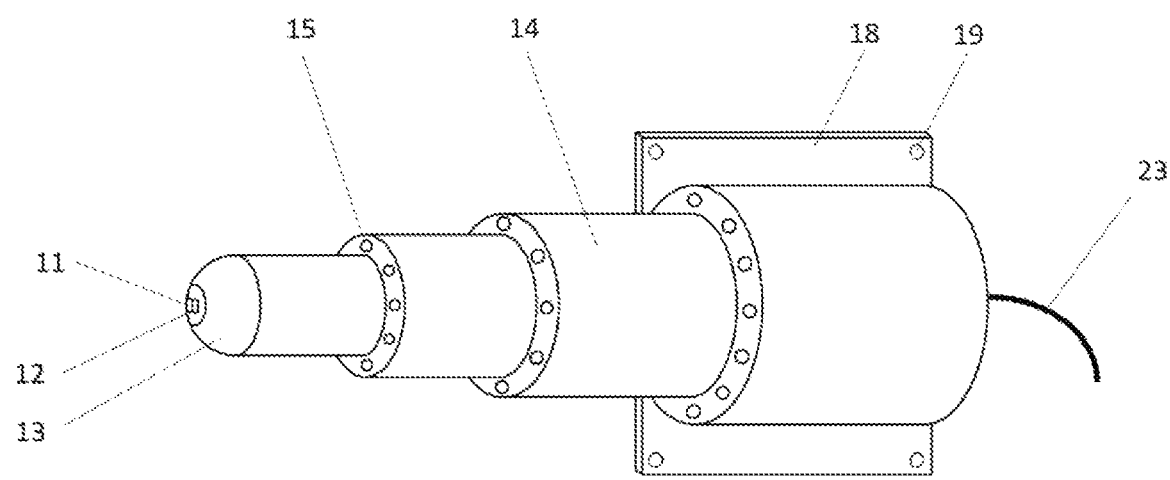
FIG. 5 is a schematic diagram of an extending state of a sonic probe for a shield tunneling machine.

As shown in FIG. 4 and FIG. 5, the probe telescopic protection apparatus is completed by coordination of a spherical rotation protection apparatus 13, the hydraulic propelling apparatus and the pressure sensor 12, and a specific installation mode refers to FIG. 4. The probe protection apparatus 13 is a spherical protection apparatus, specifically, a spherical metal shell; the sonic probe groups are installed in the spherical metal shell, and the spherical metal shell can rotate relative to a head of the push rod; sealing is performed between the spherical protection apparatus and the head of the push rod, and mud is prevented from entering the hydraulic propelling apparatus due to a feature of airtight contact of the both. In a process of normal tunneling of the shield tunneling machine, by means of a feature that a spherical shape is capable of turning over and rotating, probes are rotated into the hydraulic propelling apparatus, and thus a protection effect on the probes is realized. It needs to be noted that in the present invention, one sonic probe group is correspondingly provided with one probe telescopic protection apparatus, for example, in the present embodiment, there are 30 sonic probe groups, so 30 probe telescopic protection apparatuses are correspondingly installed.

As a further technical solution, a plurality of high-pressure water spray nozzles 15 are arranged annularly at periphery of a top of each section of the hydraulic telescopic rod of each hydraulic propelling apparatus, and before retracting and in a process of retracting of the hydraulic telescopic rod, a high-speed water flow can be sprayed with the water spray nozzles to wash away mud and dirt on the hydraulic telescopic rod, and the hydraulic telescopic rod is prevented from being blocked by sundries during retracting. The high-pressure water spray nozzles 15 are connected with a spray nozzle booster 22 through a pipeline, and the spray nozzle booster 22 is connected with the water supply apparatus.

As a further technical solution, the pressure sensor 12 is installed on the spherical rotation protection apparatus 13, and the hydraulic propelling apparatus with the pressure sensor is adopted, after the pressure sensor of the probe at the top reaches a certain threshold, propelling of the hydraulic telescopic rod is stopped, so it is ensured that the probe can penetrate through mud or a mud cake attached to the cutterhead to adhere to the tunnel face.

The present embodiment further provides an exploration method based on an apparatus for phased array sound wave advanced geological exploration for a shield tunneling machine, which includes:

step 1, turning on a probe protection apparatus, and pushing, by a hydraulic telescopic rod, a plurality of sonic probe groups forwards till all the sonic probe groups are in good contact with a tunnel face;

step 2, performing triggering through a single sonic probe group, receiving and obtaining, by all the sonic probe groups, reflected echo information, and obtaining a background velocity field by using a processing and imaging system;

step 3, controlling, by the system, different delays of all the sonic probe groups according to the background velocity field to form a scanning sound beam in a certain direction;

step 4, receiving, by each of the sonic probe groups, an echo signal, storing the echo signal in a storage unit, uploading, by the storage unit, echo data to the processing and imaging system, and obtaining, by the processing and imaging system, an imaging result of a suspected abnormal body position in a scanning direction at a side;

step 5, performing, by the system, one-by-one focusing by changing trigger delay between the sonic probe groups according to the suspected abnormal body position, receiving, by each of the sonic probe groups, the echo signal, storing the echo signal in the storage unit, uploading, by the storage unit, data to the imaging system, and obtaining a detailed two-dimensional single-direction scanning result;

step 6, repeating step 3, step 4 and step 5, performing scanning sound beams in different directions by changing the delays of the sonic probe groups till data collection and uploading of a whole section are completed, and receiving, by the processing and imaging system, scanning and imaging data of a whole two-dimensional section to complete a two-dimensional section image;

step 7, rotating a cutterhead to enable a whole sound wave array element group to rotate by an angle around a central axis of the cutterhead, and repeating step 3, step 4, step 5 and step 6 to obtain a two-dimensional section image at another angle;

step 8, step 7 is repeated till exploration covers the whole tunnel face, scanning two-dimensional section images corresponding to all angles are obtained, and finally these two-dimensional sections are integrated into a three-dimensional image by the processing and imaging system; and step 9, retracting the hydraulic telescopic rod, drawing back probes, automatically washing away muddy water or dirt on the probes and the hydraulic telescopic rod in a process of drawing back, after the probes are returned, starting the protection apparatus, and starting a drying apparatus to ensure air in the hydraulic telescopic rod to be dry. Advanced geological exploration is completed.

Specific imaging steps are shown in FIG. 1. After each of the sound wave array element groups adheres to the tunnel face, a sound wave is stimulated by a single sound wave array element group with zero delay, a direct wave is received by the other sound wave array element groups, and a wave velocity of the direct wave of rock in front of the tunnel face is calculated according to a position of the probe of each of the sound wave array element groups and receiving time of the direct wave; delay time of each array transducer is calculated according to the wave velocity of the direct wave of tunnel face surrounding rock obtained in the first step and a mutual position relation of tunnel face emitting and receiving probes; sound wave emitting of each of the sound wave array element groups is controlled according to the obtained delay time, the delay time is changed, then an advancing direction of a sound wave beam is changed till scanning detection of a whole two-dimensional section in front of the tunnel face is completed, and imaging data is obtained; the imaging data is analyzed, a possible occurrence range of a geological abnormal body in front of the tunnel face is obtained, a time reversal mirror imaging algorithm is adopted, a reverse delay signal is stimulated by an array transducer, a local focus signal feature is obtained, and then two-dimensional focusing imaging is implemented; and a three-dimensional geological image in front of the tunnel face is obtained through comprehensive analysis according to a plurality of obtained two-dimensional focusing imaging results.

The apparatus and the method in the present embodiments are described detail below with reference to a specific installation process and an operation principle.

Firstly, the plurality of sonic probe groups 3 are arranged in the single-line shape or the cross shape and installed on the side wall of the main spoke, opposite to the rotation direction, of the cutterhead of the shield tunneling machine, as shown in FIG. 3, it is in a cross-shape arrangement mode.

A sound wave emitting and receiving unit of each of the sonic probe groups 3 has both functions of emitting the sound wave and receiving the reflected wave. A focus sound wave can be emitted in a phase-control mode under control of a master system.

Afterwards, extending of each of the sonic probe groups 3 is completed by coordination of the spherical rotation protection apparatus 13, the hydraulic propelling apparatus and the pressure sensor 12. Specific extending step is that under conditions that the shield tunneling machine shuts down and the cutterhead stops rotating, the spherical rotation protection apparatus 13 rotates, and one surface provided with a sonic probe group 11 is rotated to the front of an axis direction of a hydraulic telescopic rod 14. The spherical rotation protection apparatus 13 is closely connected with the hydraulic telescopic rod 14, so mud and dirt are prevented from entering a spherical probe during rotation. The spherical probe is made of a stainless alloy, so structural strength in the exploration process can be ensured, and rusting and corrosion in the humid environment in the tunnel can be avoided.

In a process that the spherical probe starts extending till making contact with the tunnel face 2, a spherical design can reduce resistance of mud and sand stone in front, penetrating through mud and sand stone in front of the cutterhead or attached to spokes is facilitated, and thus the probe is enabled to adhere to the tunnel face 2.

The hydraulic telescopic rod propels the rotation protection apparatus 13 forwards, in a process of penetrating through soil blocks attached to the cutterhead, the pressure sensor 12 in front of the spherical rotation protection apparatus 13 can monitor bearing pressure of the probe, at first, a pressure value borne by the probe is small, in a process of approaching the tunnel face, mud in front is continuously pushed aside and compacted, when the probe reaches the tunnel face 2, top pressure of the probe reaches a set pressure threshold, so it is default that the probe has already made full contact with the tunnel face, then extending of the sonic probe group 11 is stopped, the probe changes from an extending state to a collection standby state to wait for an exploration master control system 10 of the shield tunneling machine to send a collection instruction.

As the tunnel face 2 may not be completely flat, lengths of the sonic probe groups 11 extending out of the cutterhead are not necessarily consistent, and extending lengths of sonic probes are determined by a pressure value of the front sensed by the pressure sensor 12. Meanwhile, a telescopic length value of the hydraulic telescopic rod 14 is fed back to the exploration master control system 10 of the shield tunneling machine for data processing through a data transmission line 8 in the shield tunneling machine trolley, so as to define a more accurate observation system.

When all the sonic probe groups 3 have already made full contact with the tunnel face 2, in order to improve sound pressure intensity of the sonic probe groups 3, 9 sound wave emitting and receiving units of each of the sonic probe groups 3 simultaneously stimulate each group of detectors and simultaneously receive a stimulated sound wave. A background velocity of surrounding rock is calculated according to an obtained signal, then each of the sonic probe groups 3 makes stimulation in sequence according to a certain delay. On this basis, in combination with a telescopic length of the hydraulic telescopic rod 14, a stimulation delay is adjusted, and scanning signals in different directions of a measuring line are obtained.

Data fed back to the exploration master control system 10 of the shield tunneling machine is analyzed, a possible occurrence range of an abnormal body 1 in front of the tunnel face is obtained, a time reversal mirror imaging algorithm is adopted, a transducer group stimulates a reverse delay signal, a local focus signal feature is obtained, and then two-dimensional focusing imaging is implemented.

A spray nozzle water-jetting apparatus is started to wash away mud and dirt on the hydraulic telescopic rod 14, and the hydraulic telescopic rod 14 is retracted to an original position. The cutterhead is rotated by a fixed angle step length. The hydraulic telescopic rod 14 is restarted, and the sonic probe group 3 is enabled to penetrate through the mud cake to adhere to the tunnel face 2. On the basis of the imaging results in the previous step, the cutterhead is rotated by a spatial scanning angle (with an angle step length of 30°), a weight of a focusing image range of a suspected abnormal body region is adjusted and increased, and tracking imaging of the abnormal body 1 in front of the geological tunnel face is realize.

According to the above process, the cutterhead is enabled to rotate by 150°, and there are a total of six detection processes, so two-dimensional section detection data of six corresponding angles is obtained. Then the data is sent back to a data processing and imaging system, and phased array ultrasonic advanced forecast is finally realized on the basis of synthesizing imaging results in all steps.

Finally, the high-pressure water spray nozzles 15 are started to wash away mud and dirt attached to the hydraulic telescopic rod; the spherical rotation protection apparatus 13 is started, the probe is rotated into the hydraulic telescopic rod, and the hydraulic telescopic rod 14 is drawn back, and a whole exploration process ends. As shown in FIG. 1, it is summarized as follows:

After the hydraulic telescopic rod extends and reaches a preset position, an exploration process is started. Firstly, a single transducer stimulates the sound wave, a plurality of detectors are adopted for receiving, and thus a background velocity field of the surrounding rock is obtained.

Then according to the accurately defined observation system, the system performs automatic control and stimulates a focus seismic wave to complete all scanning of the two-dimensional section; afterwards, based on an multi-array-element coordinated inverse Q filter method, energy loss caused by the mud cake is compensated, and the processing and imaging system obtains an imaging result of a suspected abnormal body position in a scanning direction at a side; the system performs one-by-one focusing by changing trigger delay between the array element groups according to the suspected abnormal body position, each of the array element groups receives the echo signal, the echo signal is then stored in the storage unit, the storage unit uploads data to the imaging system, and a detailed two-dimensional single-direction scanning result is obtained.

Furthermore, the cutterhead is rotated, scanning detection of two-dimensional sections at other angles is performed, the cutterhead is rotated continuously, or two-dimensional detailed detection results at a plurality of angles are obtained, two-dimensional section imaging results at different angles are integrated into a three-dimensional imaging result, and finally, a detailed three-dimensional image in front of the tunnel face is obtained.

Finally, the hydraulic telescopic rod is drawn back, and the whole advanced geological exploration process is completed.

The present invention provides an apparatus for phased array sound wave advanced geological exploration for a shield tunneling machine, integration of the shield tunneling machine and a sound wave detection instrument is realized; the automation degree, efficiency and detection resolution are high; there is no interference with construction of the shield tunneling machine; and the requirements of being safe and efficient of the shield tunneling machine are met.

According to the observation modes suitable for the operation environment of the shield tunneling machine designed by the present invention, the cutterhead structure is reasonably utilized, limited observation space of the tunnel face is fully utilized, a detector is arranged on the cutterhead in a single-line mode or a cross shape, a reflected wave from the front of the tunnel face can be fully received, reliable detection data can be provided for the three-dimensional geological imaging of the front of the tunnel face, and meanwhile the cutterhead only needs to rotate by 150° or 60° to complete covering detection of the whole tunnel face.

A process and method for tunnel geological phased array advanced exploration time detailing imaging is designed by the present invention; on the premise of obtaining a suspected position of the abnormal geological body based on scanning and according to a difference in detection azimuth, stimulation delay of the transducer is automatically adjusted, an energy compensation method is utilized to reduce the strong attenuation of the sound wave caused by the cutterhead mud cake, and signal intensity of detecting a far field is enhanced; focusing detection and focusing of the sound wave are realized by using a time reversal mirror focusing algorithm, and finally a sub-meter detailed detection result in front of the tunnel face is obtained.

The above descriptions are merely preferred embodiments of this application and are not intended to limit this application. For those skilled in the art, this application may have various modifications and changes. Any modification, equivalent replacement, or improvement made without departing from the spirit and principle of this application shall fall within the protection scope of this application.

What is claimed is:

1. A system for phased array sound wave advanced geological exploration for a shield tunneling machine, comprising a phased array sound wave emitting and receiving apparatus arranged on a side wall of a main spoke, opposite to a rotation direction, of a cutterhead of the shield tunneling machine, wherein the phased array sound wave emitting and receiving apparatus comprises a plurality of sonic probe groups, each of the sonic probe groups comprises a plurality of sound wave emitting and receiving units, and the plurality of sonic probe groups form a sound wave array element group; each of the sound wave emitting and receiving units has functions of emitting a sound wave and receiving a reflected sound wave; and each of the sonic probe groups is installed in a probe protection apparatus, the probe protection apparatus is installed at a head of a telescopic rod of a hydraulic propelling apparatus and can rotate relative to a hydraulic push rod, and a pressure senor is further installed on the probe protection apparatus and configured to detect pressure intensity of contact between sonic probes and a tunnel face; a high-pressure water spray nozzle is arranged on the telescopic rod of the hydraulic propelling apparatus, and the high-pressure water spray nozzle is connected with a water supply apparatus through a pipeline; and the pressure sensor, the phased array sound wave emitting and receiving apparatus and the water supply apparatus are connected with a control apparatus.

2. The system for phased array sound wave advanced geological exploration for a shield tunneling machine according to claim 1, wherein the plurality of sonic probe groups are arranged in a single line mode or in a cross shape to be installed on the side wall of the main spoke, opposite to the rotation direction, of the cutterhead of the shield tunneling machine.

3. The system for phased array sound wave advanced geological exploration for a shield tunneling machine according to claim 1, wherein the plurality of sonic probe groups are distributed on side walls of the main spoke at two sides of a center of the cutterhead at equal intervals.

4. The system for phased array sound wave advanced geological exploration for a shield tunneling machine according to claim 1, wherein the probe protection apparatus is a spherical protection apparatus, each of the sonic probe groups is installed in the spherical protection apparatus, the spherical protection apparatus can rotate relative to a head of the push rod, and sealing is performed between the spherical protection apparatus and the head of the push rod.

5. The system for phased array sound wave advanced geological exploration for a shield tunneling machine according to claim 1, wherein a plurality of high-pressure water spray nozzles are arranged annularly at periphery of a top of each section of the hydraulic telescopic rod.

6. An exploration method based on the system for phased array sound wave advanced geological exploration for a shield tunneling machine according to claim 1, wherein the method comprises:

step 1), turning on a probe protection apparatus, and pushing, by a hydraulic telescopic rod, a plurality of sonic probe groups forwards till all the sonic probe groups are in good contact with a tunnel face;

step 2), performing triggering through a single sonic probe group, receiving and obtaining, by all the sonic probe groups, reflected echo information, and obtaining a background velocity field by using a processing and imaging system;

step 3), controlling, by the system, different delays of all the sonic probe groups according to the background velocity field to form a scanning sound beam in a certain direction;

step 4), receiving, by each of the sonic probe groups, an echo signal, storing the echo signal in a storage unit, uploading, by the storage unit, echo data to the processing and imaging system, and obtaining, by the processing and imaging system, an imaging result of a suspected abnormal body position in a scanning direction at a side;

step 5), performing, by the system, one-by-one focusing by changing trigger delay between the sonic probe groups according to the suspected abnormal body position, receiving, by each of the sonic probe groups, the echo signal, storing the echo signal in the storage unit, uploading, by the storage unit, data to the imaging system, and obtaining a detailed two-dimensional single-direction scanning result;

step 6), repeating step 3), step 4) and step 5), performing scanning sound beams in different directions by changing the delays of the sonic probe groups till data collection and uploading of a whole section are completed, and receiving, by the processing and imaging system, scanning and imaging data of a whole two-dimensional section to complete a two-dimensional section image;

step 7), rotating a cutterhead to enable a whole sound wave array element group to rotate by an angle around a central axis of the cutterhead, and repeating step 3), step 4), step 5) and step 6) to obtain a two-dimensional section image at another angle;

step 8), repeating step 7) till exploration covers the whole tunnel face, obtaining scanning two-dimensional section images corresponding to all angles, and finally integrating, by the processing and imaging system, these two-dimensional sections into a three-dimensional image; and step 9), retracting the hydraulic telescopic rod, drawing back probes, automatically washing away muddy water or dirt on the probes and the hydraulic telescopic rod in a process of drawing back, after the probes are returned, starting the protection apparatus, and starting a drying apparatus to ensure air in the hydraulic telescopic rod to be dry; and completing the advanced geological exploration.

7. The method according to claim 6, wherein a step length of a spatial scanning angle in step 5) is 30°; and when the plurality of sonic probe groups are arranged in a single-line mode, the cutterhead only needs to rotate five times, detection results of six two-dimensional sections are collected, and a geological condition in front of the whole tunnel face can be covered.

8. The method according to claim 6, wherein a step length of a spatial scanning angle in step 5) is 30°; and when the plurality of sonic probe groups are arranged in a cross shape, the cutterhead only needs to rotate twice, detection results of three two-dimensional sections are collected, and a geological condition in front of the whole tunnel face can be covered.

9. The method according to claim 6, wherein specific imaging steps comprises:
 1) After each sonic probe group adheres to the tunnel face, stimulating, by a single sonic probe group, a sound wave with zero delay, receiving, by the other sonic probe groups, a direct wave, and calculating a wave velocity of the direct wave of rock in front of the tunnel face according to a position of the probe of each of the sonic probe groups and receiving time of the direct wave;
 2) Calculating delay time of each sonic probe group according to the wave velocity of the direct wave of tunnel face surrounding rock obtained in step 1) and a mutual position relation of tunnel face emitting and receiving probes;
 3) Controlling sound wave emitting of each of the sonic probe groups according to the obtained delay time, changing the delay time, then changing an advancing direction of a sound wave beam till scanning and detection of a whole two-dimensional section in front of the tunnel face are completed, and obtaining imaging data;
 4) Analyzing the imaging data, obtaining a possible occurrence range of a geological abnormal body in front of the tunnel face, adopting a time reversal mirror imaging algorithm, stimulating, by the array transducer, a reverse delay signal, obtaining a local focus signal feature, and then implementing two-dimensional focusing imaging; and
 5) Obtaining a three-dimensional geological image in front of the tunnel face through comprehensive analysis according to a plurality of obtained two-dimensional focusing imaging results.

* * * * *